Aug. 26, 1958     H. GLÖCKL     2,849,266
PISTON WRIST PIN FASTENING MEANS
Filed March 20, 1956

INVENTOR
HANS GLÖCKL

BY
Marchal, Biebel, French & Bugg
ATTORNEYS

United States Patent Office 2,849,266
Patented Aug. 26, 1958

2,849,266

PISTON WRIST PIN FASTENING MEANS

Hans Glöckl, Stuttgart-Weil im Dorf, Germany, assignor to Maschinenfabrik Augsburg-Nürnberg A. G., Augsburg, Germany, a corporation of Germany Application March 20, 1956, Serial No. 572,642

Claims priority, application Germany March 25, 1955

7 Claims. (Cl. 309—19)

This invention relates to means for fastening the wrist pin in a piston, and, more particularly, to means adapted for securing the wrist pin in light metal pistons of internal combustion engines and including a sealing cover for the ends of the pin bore through the piston.

Considering an internal combustion engine piston having a transverse bore to accommodate the wrist pin or piston pin interconnecting the piston with its connecting rod, it may be desired to provide covers or closures for the outer ends of the pin bore and packing therefor against the leakage of oil therethrough. If covers are provided, instead of Seeger rings, it may be attempted to press the covers into oil-tight engagement with the piston by means of tension or expansion rings held in grooves in the piston, and, in order to prevent distortion or twisting of the tension rings, it may be attempted to provide eccentric grooves in which to maintain engagement of the tension ring. Such an arrangement, however, is complicated to produce, requiring many different parts and operations, and the relatively elastic action of such a tension or expansion ring may preclude the imposition of substantial lateral forces on the sealing cover, thereby increasing the difficulty of providing suitable or effective packing or calking against oil leakage.

According to this invention, however, fastening means are provided for maintaining the wrist pin, particularly in a light metal piston, against axial displacement, including cover plates which close the ends of the wrist pin borings and elastic tension plates for engagement in locking grooves in the piston in such manner that, upon assembly, the tension plate presses the cover plate into oil-tight engagement with the piston and is itself prevented from rotation. Preferably, the tension plates are provided in a width of at least one-fourth the diameter of the wrist pin, and are arcuately formed in cross section and provided with arcuately displaced locking tongues which are further curved approximately the thickness of the tension plate.

One object of this invention is to provide simple fastening means for securing a wrist pin in a piston by means of a cover plate and a tension plate thereover for pressing the cover plate lightly into position with the tension plate mechanically interlocked against axial or rotational displacement in the piston.

Another object of this invention is to provide a simple one-piece tension plate for holding in oil-tight engagement the end cover of a piston pin boring.

Still another object of this invention is to provide fastening means of the character described, which is readily assembled and disassembled, for holding end cover plates of a piston pin boring tightly in place and requiring a minimum of space beyond the ends of the piston pin.

A still further object of this invention is to provide in a structure of the character described a tension plate for securing a piston ring bore end cover against lateral displacement and pressing it tightly in place with a single tension plate and which also includes means to accommodate a device for easy assembly and disassembly of the structure.

Other objects and advantages of this invention will be apparent from the following description, the accompanying drawings, and the appended claims.

In the drawing—

Figure 1:
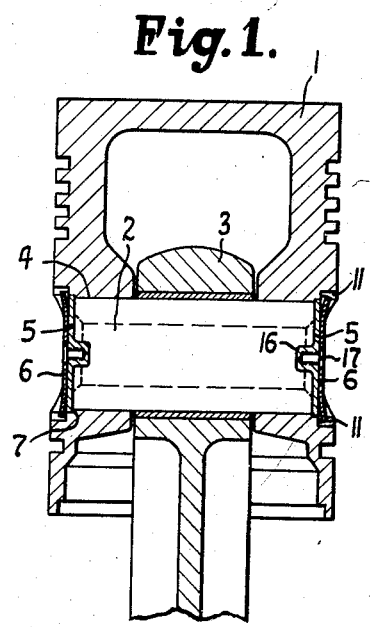
Fig. 1 is a view in vertical section of a piston of an internal combustion engine with the wrist pin secured according to the invention.

Referring to the drawings, in which like reference characters indicate like parts throughout the several views thereof, an internal combustion engine piston 1 is shown in section in Fig. 1 as having the usual construction and including a wrist pin or piston pin 2 interconnecting the piston 1 with its connecting rod 3. Wrist pin 2 is accommodated in a transverse boring 4 through piston 1, and axial displacement of pin 2 is prevented and the open ends of boring 4 are closed off by circular covers 5 bearing against an annular shoulder 7 at each end of boring 4. Covers 5 are secured in place and pressed against shoulders 7 by means of resilient tension plates or locking plates 6.

Figures 2, 3:
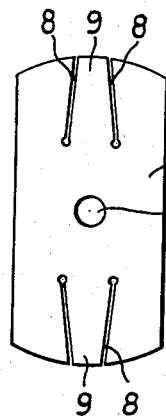
Fig. 2 is a plan view of a tension plate for use in fastening means embodying the invention.
Fig. 3 is a side view of the tension plate of Fig. 2.

As shown more particularly in Figs. 2 and 3, tension plate 6 has a substantially rectangular configuration with rounded ends, and is formed with an arcuate cross section in untensioned condition. At each end of the plates 6 are slits 8 defining therebetween flaps or tongues 9. Plates 6 are formed, as indicated in Fig. 3, with the tongues 9 more greatly curved than the rest of the plate 6 by an amount, preferably, at least the thickness of the plate 6, and the width of tension plate 6 is preferably at least one-fourth the diameter of wrist pin 2.

Figure 8:
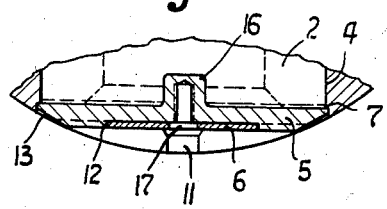

The outer surfaces of the covers 5 are provided with a groove 12 corresponding to the width of tension plate 6, and are preferably beveled off at the outer edges, as indicated at 13, in order to increase the bearing surface against pin 2 for the least thickness of the fastening means when in place in a piston of circular cross section, as indicated more particularly in Fig. 8. Covers 5 also included a central boss portion 16 with internal screw threads for the temporary accommodation of bolt 15 during assembly and disassembly as hereinafter described. Tension plate 6 is provided with a hole 17 disposed to overlie boss 16 when in assembled condition.

As previously noted the wrist pin boring 4 of piston 1 is provided at either end with shoulders 7 against which cover plates 5 are pressed by tension plates 6. An undercut circular groove 10 is also provided in piston 1 concentrically around boring 4, which groove 10 is open to the outside at two diametrically opposed portions indicated at 18 for the insertion of plate 6 therein. Two diametrically opposed recesses 11 are also provided in piston 1 disposed on a diameter substantially perpendicular to the diameter between open portions 18 of grooves 10.

Figure 4:
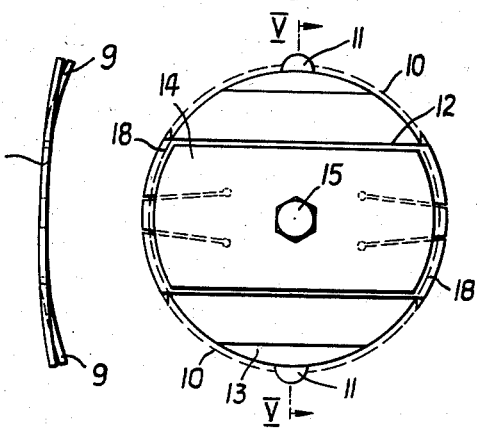
Fig. 4 is a plan view of a fastening means embodying the invention being assembled.
Figure 5:
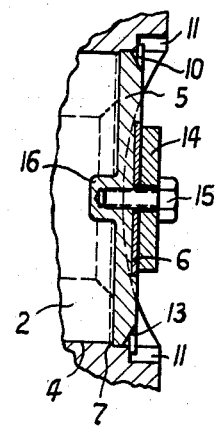
Fig. 5 is a section along the line V—V of Fig. 4.

The assembly and disassembly of the wrist pin and fastening means will now be explained. After inserting wrist pin 2 into boring 4 in piston 1, and through connecting rod 3, cover plate 5 is laid in place against pin 2 covering the end of boring 4. Tension plate 6 is then inserted in the position shown in Fig. 4 so that the curved ends of plate 6 fall into the open portions 18 of groove 10. A temporary assembly plate 14 is superimposed on plate 6 and affixed in position by bolt 15 engaging boss 16 on cover plate 5. By tightening bolt 15, tension plate 6 is flattened against its arcuate cross section by pressure between plate 14 and cover 5, as indicated in Figs. 4 and 5.

Figure 6:
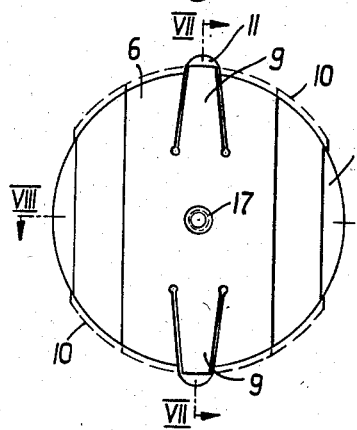
Fig. 6 is a plan view of fastening means embodying the invention in installed condition.
Figure 7:
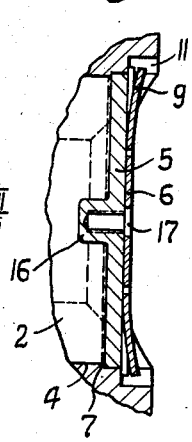
Figs. 7 and 8 are sections along the lines VII—VII, VIII—VIII, respectively, of Fig. 6.

The entire assembly is then rotated through aproximately 90 degrees so that tension plate 6 assumes the position indicated in Fig. 6. In this manner, and because of the flattening of tension plate 6 under the pressure of plate 14 and bolt 15, the curved outer edges of plate 6 are engaged in groove 10, while the tongues 9 of plate 6 coincide with the diametrically opposed recess 11. In this position, then, bolt 15 and plate 14 are removed, thereby releasing the tension on tension plate 6 and causing it to tend to assume its arcuate cross section, thereby pressing cover 5 firmly against the shoulder 7 of boring 4 as the curved ends of plate 6 are firmly engaged in groove 10. Also, when the tension of plate 14 and bolt 15 is released, the more greatly curved tongues 9 of plate 6 spring out into the recesses 11 beyond groove 10, thereby locking plate 6 positively against rotation. Disassembly of the wrist pin fastening, it will be understood, involves merely the reverse of the foregoing assembly operations with depression or flattening of tension plate 6 by installing plate 14 and bolt 15 so that tension plate 6 can be once more rotated back to position shown in Fig. 4 and removed through clearances 18 in groove 10.

It will accordingly be seen that a fastening means according to this invention provides a simple one-piece arrangement for securing and tightly pressing the cover plate in the ends of a wrist pin boring and holding it in place under tension. The invention requires no bolts or other protrusions which might extend beyond the circular cross section of the piston 1, and the single tensioning and securing member is positively locked in place against axial or rotational displacement in use.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In wrist pin fastening means of the character described for fastening a sealing cover at the ends of the wrist pin bore of a piston, the combination which comprises an undercut groove around said bore, an arcuately deformed resilient tension plate for engagement in said groove to secure said cover in position, and means on said tension plate for interlocking with said groove, said groove being largely discontinuous for insertion thereinto of said interlocking means.

2. In wrist pin fastening means of the character described for fastening a sealing cover at the ends of the wrist pin bore of a piston, the combination which comprises an undercut groove around said bore, an arcuately deformed resilient tension plate for engagement in said groove to secure said cover in position, the width of said tension plate being at least one-fourth the diameter of said wrist pin.

3. In wrist pin fastening means of the character described for fastening a sealing cover at the ends of the wrist pin bore of a piston, the combination which comprises an undercut groove around said bore, an arcuately deformed resilient tension plate for engagement in said groove to secure said cover in position, means for inserting said tension plate into said groove for locking engagement therein, and means for locking said tension plate against rotation.

4. In wrist pin fastening means of the character described for fastening a sealing cover at the end of the wrist pin bore of a piston, the combination which comprises an undercut groove around said end of said pin bore, a tension plate for engagement in said groove to secure said cover in place, the length of said tension plate being such that end portions only thereof engage in said groove, diametrically opposed entrances to said groove for insertion of the ends of said tension plate therein, a locking tongue on said tension plate, and a recess in said piston angularly removed from said groove entrances for engaging said locking tongue to prevent rotation of said tension plate.

5. In fastening means of the character described for securing the wrist pin in the wrist pin boring of a piston the combination which comprises an annular shoulder around the end of said boring, a cover plate for covering said end of said boring and engaging said annular shoulder, an arcuately deformed tension plate for securing said cover in position, a transverse depression in said cover for accommodating said tension plate, an undercut annular groove around said boring for engaging said tension plate in one angular position thereof, said undercut groove being open for receiving the ends of said tension plate therein another angular position of said tension plate, a locking tongue on said tension plate, and a recess in said piston for engagement with said locking tongue on said tension plate for preventing rotation of said tension plate when in assembled position.

6. In fastening means of the character described for securing the wrist pin in the wrist pin boring of a piston the combination which comprises a cover plate for the end of said boring, a resilient tension plate for securing said cover in position, a transverse depression in said cover for accommodating said tension plate, outer edges of said cover plate being beveled to reduce the thickness thereof, undercut angular grooves in said piston for engaging the ends of said tension plate, said undercut grooves extending only partially around said boring with the space therebetween being sufficient to admit the ends of said tension plate into said grooves, and means on said cover plate for temporarily depressing said tension plate for insertion of the ends thereof into said grooves upon rotation of said cover and said tension plate.

7. In fastening means of the character described for securing the wrist pin in the wrist pin boring of a piston, the combination which comprises a cover plate for closing the end of said boring, a resilient tension plate for securing said cover in position, an undercut annular groove around said boring for receiving end portions of said tension plate, means for inserting said end portions of said tension plate into said groove when said tension plate is deformed out of untensioned condition, means on said cover plate and said tension plate for temporarily deforming said tension plate for insertion thereof into said groove, and means cooperating between said piston and said tension plate for securing said tension plate against rotation when in assembled position.

References Cited in the file of this patent

UNITED STATES PATENTS

| | | |
|---|---|---|
| 1,415,422 | Allen | May 9, 1922 |
| 2,747,953 | Laubender | May 29, 1956 |